Patented Apr. 11, 1950

2,503,920

UNITED STATES PATENT OFFICE 2,503,920

METHOD OF COATING FRUITS AND VEGETABLES

Sidney C. Rieke, San Juan, Tex.

No Drawing. Application January 30, 1947, Serial No. 725,259

1 Claim. (Cl. 99—168)

The invention relates to a composition of materials to be used in the waxing of fruits and vegetables.

The present invention is in the nature of an improvement of the subject matter disclosed and claimed in my prior copending application, Serial No. 441,231, filed April 30, 1942, for a Fruit and vegetable coating wax.

In such prior application the disclosure embodies an apparatus and method whereby the wax to be applied to the articles is provided in cake form whereas the prior art generally either heated the wax or sprayed the wax in the form of an emulsion in order to apply such wax to the articles. The applicant appears to have been the first to make up the wax in cake form and to brush the wax from the cake in the form of finely divided particles in such a manner that such particles would fall by gravity upon the articles to be waved as is more fully described in such prior application. Reference is also made to my prior copending application Serial No. 467,003, filed November 26, 1942, now Patent No. 2,341,309, for a Waxing machine and also to my prior copending application, Serial No. 287,813, filed August 1, 1939, for a Fruit and vegetable waxer which matured into Patent 2,372,225, March 27, 1945.

The improvement in the present invention and application constitutes the addition of a percentage of a rot and mold inhibiting material. There are many such materials. One which has been found satisfactory is diphenyl. Varying percentages thereof may be added to the wax so that such inhibitor is retained by the wax as it is brushed from the cake and applied to the fruit and vegetables. Any such percentage can be used up to not exceeding 25% by weight of the wax.

An advantage of embodying such inhibiting material in the wax in cake form arises from the fact that no heat is applied to the wax and the diphenyl remains in the composition of the wax particles and is in this manner carried on to the fruit.

It is, therefore, one of the objects of the present invention to embody a rot and mold inhibiting material in wax in cake form to be applied in the waxing of fruit and vegetables.

Another object of the invention is to brush wax containing a percentage of rot and mold inhibiting material from a cake onto fruit and vegetables in performing the waxing thereof.

It is believed that the invention will be more readily understood when the following detailed description is considered.

The applicant's procedure for making up the cakes of wax is fully disclosed and claimed in the first mentioned copending application where the cake of wax is made up of a wax which is relatively soft and enclosed in a shell of relatively hard wax so that the cake of wax may be handled, retained by machine and brushed on to the articles effectively.

The present invention contemplates that the inhibiting material such as the diphenyl may be embodied in either one or both the soft and the hard waxes. If embodied in the soft wax in the center of the cake then the hard wax acts as a shell or retainer thereof to prevent evaporation in order to obtain a more efficient application of the diphenyl to the articles.

Most known rot and wax inhibiting materials have a relatively low evaporation point and if the wax is heated or sprayed it has been found that diphenyl added to such waxes and applied by heating or spraying evaporates to such an extent that its application to the articles is frustrated. The advantage in incorporating the diphenyl or other inhibiting material in the wax in cake form appears to be obvious.

The invention contemplates broadly the incorporation of a stem end rot and mold inhibiting material in a fruit and vegetable wax provided in cake form for application to the fruit or vegetables.

What is claimed is:

A method of using a soft normally unstable wax in coating fruit and vegetables wherein the wax is brushed from a cake in the form of small particles which comprises enclosing the soft unstable wax in a shell of relatively harder normally stable wax to provide a cake which can be handled, and brushing from such cake a shower made up of both soft wax and harder wax particles to fall by gravity to contact the article being coated where the soft wax has a percentage of a mold and rot inhibiting material so that the hard shell tends to retain such material.

SIDNEY C. RIEKE.

REFERENCES CITED

The following references are of record in the file of this patent:

UNITED STATES PATENTS

| Number | Name | Date |
|---|---|---|
| 22,592 | Tatum | Jan. 11, 1859 |
| 1,726,304 | Lewis | Aug. 27, 1929 |
| 1,900,295 | McDill | Mar. 7, 1933 |
| 2,002,589 | Sharma | May 28, 1935 |
| 2,054,392 | Sharma | Sept. 15, 1936 |
| 2,058,584 | Sastel | Oct. 27, 1936 |